United States Patent [19]

Savard

[11] 4,104,971
[45] Aug. 8, 1978

[54] CAR WASH CONVEYOR BELT SAFETY PROTECTION SYSTEM

[75] Inventor: Gilbert Savard, St. Leonard, Canada

[73] Assignee: BP Canada, Canada

[21] Appl. No.: 752,959

[22] Filed: Dec. 20, 1976

[30] Foreign Application Priority Data

May 4, 1976 [CA] Canada ............................ 251780

[51] Int. Cl.² .................... B61B 13/00; B65G 35/00
[52] U.S. Cl. ................................. 104/172 B; 104/117
[58] Field of Search ............... 104/172 B, 155, 117; 198/630

[56] References Cited

U.S. PATENT DOCUMENTS

| 916,081 | 3/1909 | Williams et al. | 104/117 |
|---|---|---|---|
| 1,044,321 | 11/1912 | Wieprecht | 104/117 |
| 2,052,001 | 8/1936 | Platt | 198/630 |
| 3,058,433 | 10/1962 | Hurst | 104/172 B |
| 3,687,083 | 8/1972 | Brown | 104/155 |
| 3,785,295 | 1/1974 | Kiukkonen | 104/172 B X |
| 3,848,538 | 11/1974 | Hondzinski | 104/155 |

Primary Examiner—Randolph A. Reese
Attorney, Agent, or Firm—Beveridge, DeGrandi, Kline & Lunsford

[57] ABSTRACT

A car wash conveyor system has a conveyor pit extending the length of a car wash enclosure. A continuous chain with spaced rollers thereon is driven along the conveyor between wheel guides. A nylon belt anchored at both ends of the conveyor overlays the rollers, the latter creating a wave form in the belt which causes rotation of automobile tires lying forwardly of the rollers and engaged by the belt.

1 Claim, 5 Drawing Figures

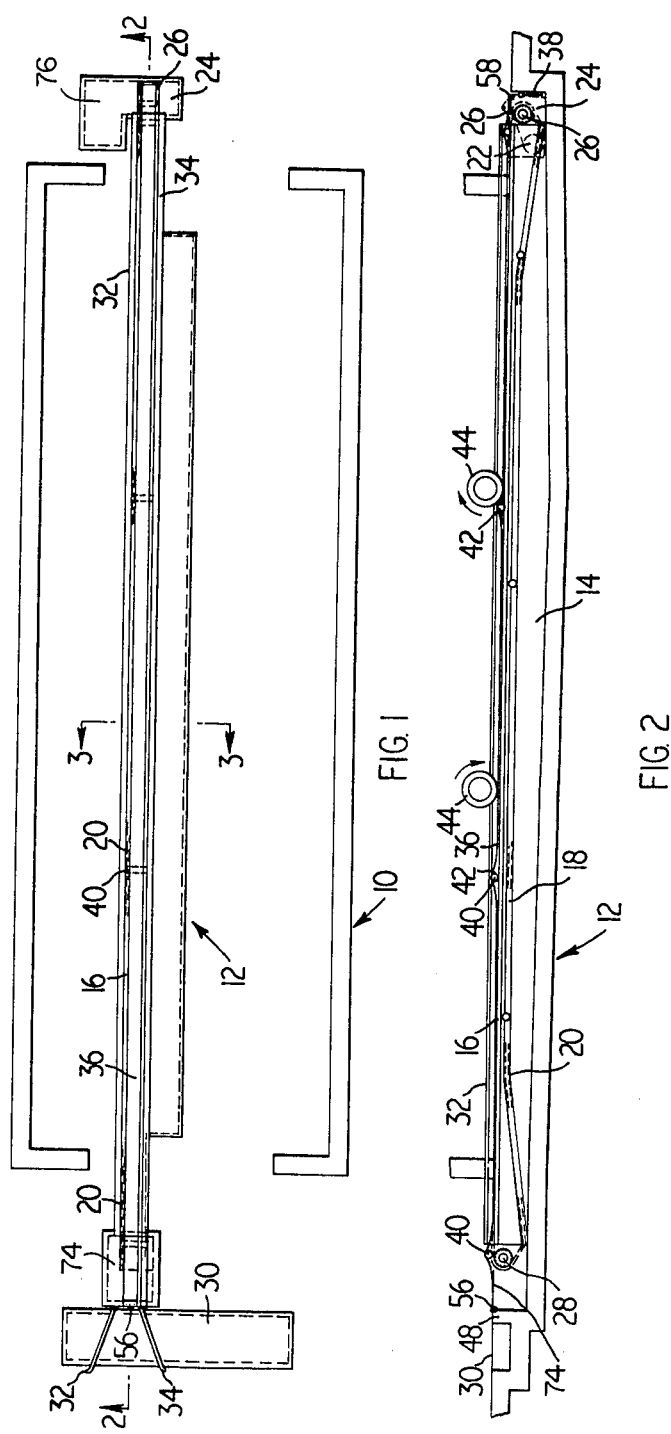

CAR WASH CONVEYOR BELT SAFETY PROTECTION SYSTEM

This invention relates to conveyors and specifically to a conveyor belt safety protection for use in car wash systems.

Conventional automobile car wash systems use chain driven rollers or secondary connecting chains to push or pull an automobile through the washing enclosure. The drive chain is usually exposed on its upper run so that the secondary chains can be connected to it. If a roller system is used, chain exposure is not as great but in both cases injuries to wash operators may occur because of the exposed moving components.

The conveyor according to the invention overcomes the abovementioned prior art deficiencies by utilizing a stationary safety belt anchored at either end of the conveyor and overlying the travelling rollers.

According to a broad aspect, the invention relates to a car wash conveyor system comprising a conveyor pit extending the length of a car wash enclosure; idle and drive sprocket pit enclosures at either end of said conveyor pit; a continuous chain driven about said sprockets and along an upper run and a lower run of said conveyor; means for rotating said drive sprocket; wheel guides bordering the upper run of said conveyor; and a belt extending the length of said upper run and overlying said rollers, said belt being anchored at both of its ends and tensioned so that when said rollers are driven along said upper run beneath said belt a wave is created therein to engage and rotate automobile tires lying forwardly of the rollers on said belt whereby said automobile is propelled along the upper run of the conveyor.

The invention is illustrated by way of example in the accompanying drawings wherein:

FIG. 1 is a plan view of a car wash enclosure showing the conveyor;

FIG. 2 is a cross-sectional view taken along the lines 2—2 of FIG. 1;

Figure 3:
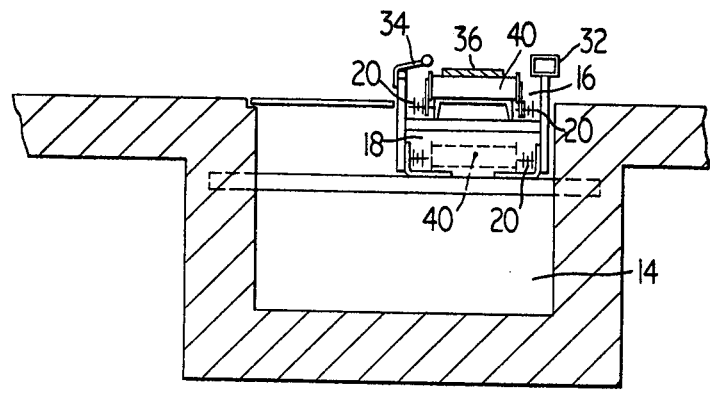
FIG. 3 is a cross-sectional view taken along the line 3—3 of FIG. 1.

Referring to FIG. 1 a car wash enclosure 10 has a conveyor 12 extending the length thereof for propelling an automobile therethrough at a controlled rate. To this end, conveyor 12 comprises a pit 14 having upper and lower runs 16 and 18 for an endless chain 20 driven by a suitable motor 22, in a drive pit 24 at the exit end of the enclosure, through drive and idler sprockets 26, 28 respectively mounted at either end of the conveyor 12.

As shown in FIGS. 1 and 2, the conveyor includes a correlator 30 with lead-in wheel guides 32, 34 which, beyond the correlator, extend parallel throughout the length of the conveyor 12 for maintaining automobile wheels in a guided path.

A stationary belt 36 is anchored to one end of the pit 14 adjacent the correlator and extends the length of the conveyor between the wheel guides 32, 34. The other end of the belt 36 is yieldably anchored by belt tensioning means 38 mounted in the drive pit 24.

A plurality of rollers 40 are spaced throughout the length of the chain 20 and, as shown in FIG. 2, are drawn along the conveyor top run 16. With proper tension, the belt 36 lies flat between the rollers which create wave forms 42 which engage wheels 44 of an automobile thereby moving the latter throughout the length of the conveyor 12.

Figure 4:
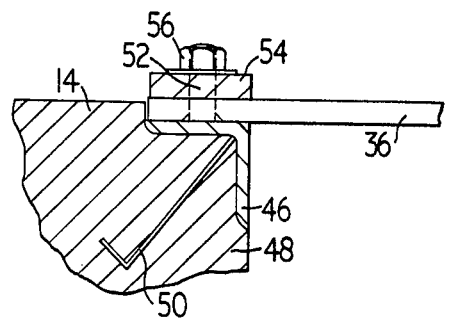
FIG. 4 is a fragmentary sectional view of one end of the belt anchorage.

The belt 36 is anchored at the correlator end of the conveyor as shown in FIG. 4. A section of steel angle 46 is secured in a lip 48 of the pit 14 by an anchor plate 50. A plurality of studs 52 are welded to the top of the angle 46 and the end of belt 36 is apertured to fit over the studs 52 and is secured thereto by a plate 54 and nuts 56.

Figure 5:
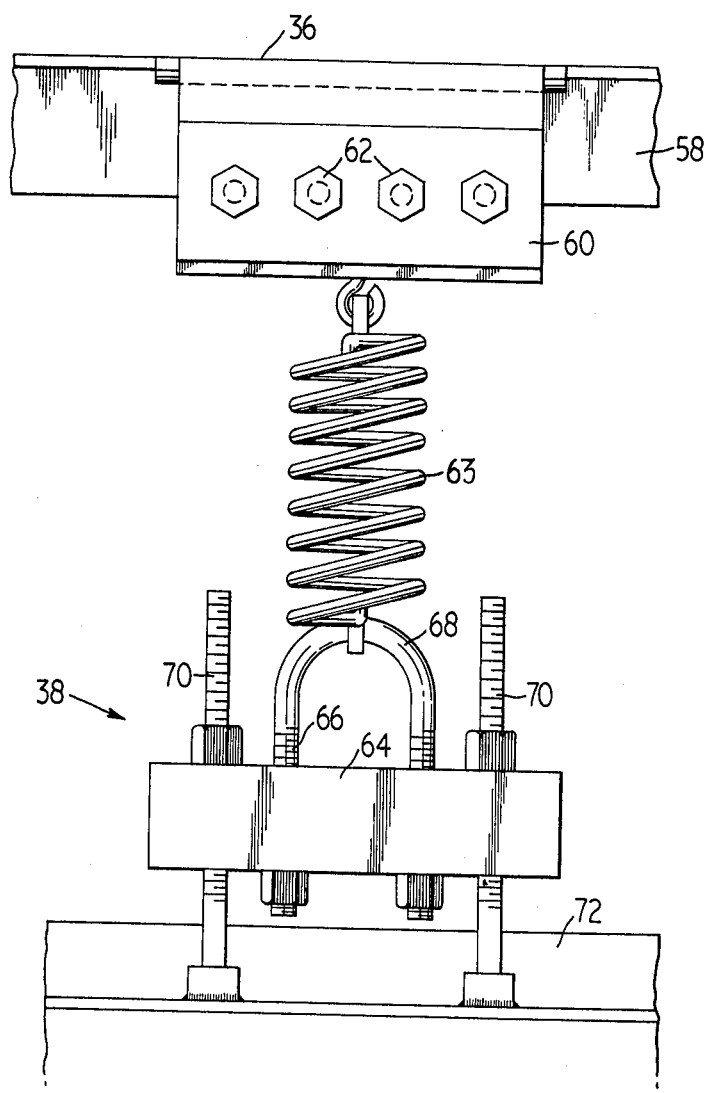
FIG. 5 is an elevation view of the other end of the belt anchorage and the tensioning means.

In order to maintain proper tension in and to take up wear in the belt 36, it is yieldably secured at the drive pit 24 by tensioning means shown in detail in FIG. 5. The end of the belt 36 terminates over a steel angle lip 58 in a steel clamp plate 60 secured to the belt by suitable studs 62. Plate 60 is hooked to the upper end of a coil spring 63 having its lower end adjustably mounted in a block 64 by threaded legs 66 of a U-bolt 68. Block 64 is mounted for height adjustment on a pair of vertical threaded studs 70 welded at their lower ends to a steel member 72 secured in the floor of pit 24.

Beneath the belt 36 a run-on plate 74 is provided at the entrance end of the conveyor 12 and at the exit end a run-off plate 76 is provided over the steel lip 58.

It will be appreciated that provision of belt 36 substantially covers the travelling rollers 40 and that the drive chain 20 may be placed lower in the conveyor 12 so that danger to operators may be minimized.

I claim:

1. In a car wash conveyor system, for use in a car wash enclosure, and including an elongated conveyor pit extending the length of the car wash enclosure; an idler sprocket pit at one end of the conveyor pit and having an idler sprocket therein; a drive sprocket pit at the second end of the conveyor pit and having a drive sprocket therein; means for rotating the drive sprocket; and a continuous chain drive extending around the sprockets and along an upper run and a lower run between the sprockets and carrying a plurality of elongated rollers extending transverse the chain drive; the improvement comprising an elongated, substantially flat-surfaced continuous safety belt having a first end anchored at the idler sprocket pit and a second end anchored at the drive sprocket pit and overlying the idler sprocket pit, the conveyor pit, and the drive sprocket pit to substantially prevent insertion of foreign objects into the path of the rollers, the belt contacting the rollers on the upper run to cause waves in the belt to move the length of the upper run as the rollers are carried by the upper run while the drive sprocket is rotated, the waves engaging automobile tires lying on the belt to rotate the tires along the belt, and thus to propel automobiles the length of the upper run.

* * * * *